United States Patent

Wolf

[11] Patent Number: 5,961,584
[45] Date of Patent: Oct. 5, 1999

[54] SYSTEM FOR MANAGING INTERNAL EXECUTION THREADS

[75] Inventor: Mikael Wolf, Älvsjö, Sweden

[73] Assignee: Telefonaktiebolaget LM Ericsson, Stockholm, Sweden

[21] Appl. No.: 08/849,554

[22] PCT Filed: Dec. 8, 1995

[86] PCT No.: PCT/SE95/01480

§ 371 Date: Jun. 2, 1997

§ 102(e) Date: Jun. 2, 1997

[87] PCT Pub. No.: WO96/18148

PCT Pub. Date: Jun. 13, 1996

[30] Foreign Application Priority Data

Dec. 9, 1994 [SE] Sweden .................................. 9404294

[51] Int. Cl.[6] .......................................................... G06F 9/46
[52] U.S. Cl. ........................................... 709/103; 709/100
[58] Field of Search .................................... 709/100, 103, 709/107

[56] References Cited

U.S. PATENT DOCUMENTS

| 5,057,996 | 10/1991 | Cutler et al. . |
| 5,247,675 | 9/1993 | Farrell et al. . |
| 5,305,455 | 4/1994 | Anschuetz et al. . |
| 5,319,782 | 6/1994 | Goldberg et al. . |
| 5,345,588 | 9/1994 | Greenwood et al. . |
| 5,355,488 | 10/1994 | Cox et al. . |
| 5,377,191 | 12/1994 | Farrell et al. ............................. 370/401 |
| 5,421,013 | 5/1995 | Smith . |
| 5,517,636 | 5/1996 | DeHart et al. ........................... 709/240 |
| 5,574,939 | 11/1996 | Keckler et al. ............................ 712/24 |
| 5,606,659 | 2/1997 | Målöy . |
| 5,630,128 | 5/1997 | Farrell et al. ........................... 709/103 |
| 5,652,834 | 7/1997 | Jansson . |
| 5,870,464 | 2/1999 | Brewster et al. ....................... 379/219 |
| 6,247,675 | 9/1921 | Farrell et al. ........................... 709/103 |

*Primary Examiner*—Majid A. Banankhah
*Attorney, Agent, or Firm*—Burns, Doane, Swecker & Mathis, L.L.P.

[57] ABSTRACT

In a system for managing internal execution threads in a process, the execution threads are driven by process internal event messages. These messages are distributed to event receiving threads based upon distribution categories of event generating functions and performed only to event receiving threads which have interest in such internal messages and cause monitoring of the occurrency thereof. With each distribution category there is associated a number of event receiving threads, a number of first entities representing one or more monitorings for one event generating function to some event receiving thread, a number of second entities representing a monitoring for event generating functions of the distribution category, and a third entity for keeping track of all event receiving threads that have monitored the distribution category.

28 Claims, 9 Drawing Sheets

SYSTEM FOR MANAGING INTERNAL EXECUTION THREADS

TECHNICAL FIELD OF THE INVENTION

The present invention generally relates to execution mechanisms in a telecommunication data system. More particularly the invention relates to managing internal execution threads in a process.

When implementing an object-oriented telecommunication application, it is feasible to divide it into an object model, representing the resources of the system (like channels, tone senders, etc.) and control logic, carrying out the application control functions. The control logic further benefits from being divided into separate activities, like call control, bearer connection control, etc.

The execution environment for the application is the process. By process is here meant a run-time environment intended for a certain activity, for example a telephony call. The process environment is located entirely to a certain processor and consists of memory (heap, stack) and execution ability. Within the process threads are executed pseudo-concurrently. The process also contains the object model.

The thread is the execution resource for control logic. The execution of a thread is driven by events generated by the object model. Several threads may be triggered by the same event which then will be distributed in thread priority order. The events are typically generated as responses to external events, for example, a signalling message received by the process.

The thread may monitor individual events from some specific object, any event from some object, an individual event from a class of objects, or any event from a class of objects. A thread maintains its own thread context, i.e. stack and processor registers, but shares heap with- all other threads.

The threads provide a powerful support for splitting complex activities into relatively independent sub-activities. The logic in a thread executes either until it enters a state where it needs an event to continue, or until it finishes its execution. When a thread enters a wait state or finishes its execution, other threads are given the possibility to execute. This means that all asynchronous events are delivered to the control logic when it is ready to deal with it.

The object model is used as an abstraction of the real objects necessary for the application, like an ISDN-subscriber's terminal, a connection, a subscriber, etc. The objects offer services to the control logic via method calls, for example a method "connect" offered by a connection object. The objects encapsulate data, thereby maintaining their own state. The objects may also communicate with the world outside the process by sending messages to and receiving messages from other processes.

DESCRIPTION OF RELATED ART

In U.S. Pat. No. 5,421,013 an application is a collection of instances of agent classes, each agent class having its own message dispatching function. Multithreading is provided by an application programming interface which contains a master dispatcher process non-preemptively allocating time to individual agents.

In U.S. Pat. No. 5,355,488 a method by which a task once set-up by an application program interface is retained in an idle status after the task is complete. Set-up tasks are maintained in a pool. A task manager, in response to an application work request, initially searches the pool for an idle task corresponding to the task request. If there is a corresponding idle task in the pool, control passes to the application code for execution.

U.S. Pat. No. 5,345,588 discloses a method for providing each thread of execution of a multi-threading digital data processing environment with private copies of each set of initialization data that is required by procedures which are executed in the context of more than one of the threads.

U.S. Pat. No. 5,319,782 discloses synchronizing the dispatching of tasks from a first multitasking operating system with threads of function calls opportunistically dispatched from a second multitasking operating system. The second operating system includes a set of callable resources. A task becomes bound to a thread for the duration of that thread's ownership of a callable resource from the second operating system.

In U.S. Pat. No. 5,305,455 a data processing system is operable in a multitasking mode to include at least one process having a plurality of threads. Exception management is done on a per thread basis, as opposed to a per process basis.

In U.S. Pat. No. 5,247,675 a multitasking operating system permits application programs to influence a schedule of execution of program threads which constitute the application programs by specifying parameters for the program threads. The parameters indicate each thread's priority level and dispatch class in which the thread resides.

SUMMARY

When designing large real-time software systems, for example software controlling a telephony exchange, the inherent complexity of the application, which stems from the real-time events that the exchange must handle, often tends to make the programs hard to write, understand and maintain.

One object of the invention is to provide a framework and a mechanism for structuring such software in a way that the real-time behaviour of the application will be easier to handle, thereby decreasing the complexity of the software, making it easier to write, understand and maintain.

In a system according to the invention for managing internal execution threads in a process, the execution threads are driven by process internal event messages, which are generated by event generating functions in response to occurred internal or external incidents. The internal event messages are distributed to event receiving threads having priority. The distribution is controlled by an event handling function based upon distribution categories of the event generating functions and is performed only to event receiving threads which have interest in such internal messages and cause monitoring of the occurrency thereof. For each distribution category there are actors among which can be mentioned: a number of event receiving threads; a number of first entities which represent one or more monitorings for one event generating function to some event receiving thread; a number of second entities which represent a monitoring for event generating functions of the distribution category, each second entity having a list of all first entities which have monitored an event receiving thread; one third entity which keeps track of all event receiving threads that have monitored the distribution category by means of a list of the second entities; a number of event generating functions which each keeps a list of the first entities.

There are a number of important embodiments of the above structure appearing from claims 2–5.

Each first entity keeps a pointer to the event generating function and information regarding the priority of the event receiving thread.

Each second entity is pointed to by one or more of the first entities, and keeps a pointer to an event receiving thread for forwarding distributed event messages to it.

The third entity's list of the second entities points to the event receiving threads.

Each event generating function keeps a pointer to the event handling function for forwarding of events.

Further advantageous embodiments appear from claims 6–28.

BRIEF DESCRIPTION OF THE DRAWINGS

The invention will now be described more closely below with reference to the drawings, in which.

DETAILED DESCRIPTION

When implementing an object-oriented telecommunication application, it is feasible to divide it into an object model, representing the resources of the system (like channels, tone senders, etc.) and control logic, carrying out the application control functions. The control logic further benefits from being divided into separate activities, like call control, bearer connection control, etc.

The execution environment for the application is the process. By process is here meant a run-time environment intended for a certain activity, for example a telephony call. The process environment is located entirely to a certain processor and consists of memory (heap, stack) and execution ability. Within the process threads are executed pseudo-concurrently. The process also contains the object model.

The thread is the execution resource for control logic. The execution of a thread is driven by events generated by the object model. Several threads may be triggered by the same event which then will be distributed in thread priority order. The events are typically generated as responses to external events, for example, a signalling message received by the process.

The thread may monitor individual events from some specific object, any event from some object, an individual event from a class of objects, or any event from a class of objects. A thread maintains its own thread context, i.e. stack and processor registers, but shares heap with all other threads.

The threads provide a powerful support for splitting complex activities into relatively independent sub-activities. The logic in a thread executes either until it enters a state where it needs an event to continue, or until it finishes its execution. When a thread enters a wait state or finishes its execution, other threads are given the possibility to execute. This means that all asynchronous events are delivered to the control logic when it is ready to deal with it.

The object model is used as an abstraction of the real objects necessary for the application, like an ISDN-subscriber's terminal, a connection, a subscriber, etc. The objects offer services to the control logic via method calls, for example a method "connect" offered by a connection object. The objects encapsulate data, thereby maintaining their own state. The objects may also communicate with the world outside the process by sending messages to and receiving messages from other processes.

It will here be assumed, as an example, that threads are specially designed to support the object semantics used by programs coded in a particular graphical programming language having primarily a graphical syntax, although C++ coded programs can also be written to conform to these semantics.

Figure 1:
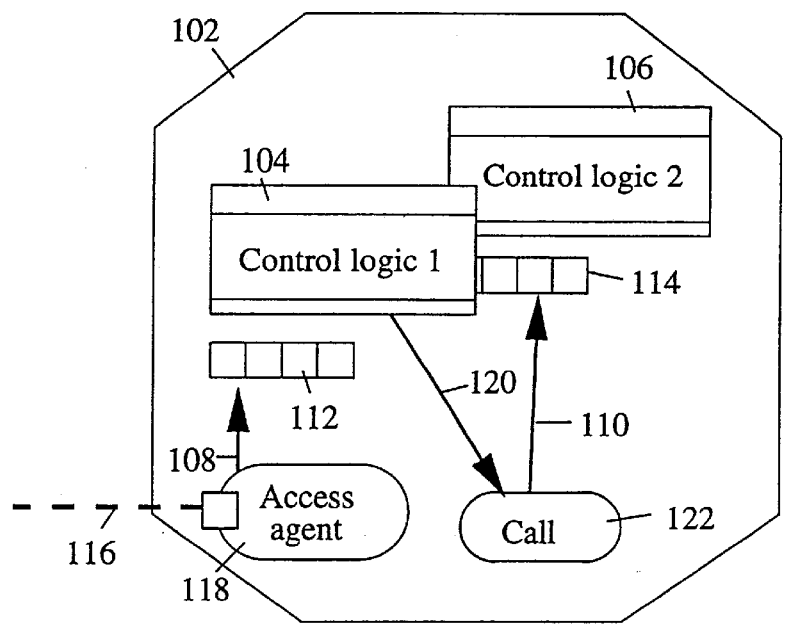
FIG. 1 is a view illustrating execution of threads.

As an example of that stated above thus far, FIG. 1 illustrates a process 102 having two threads 104 and 106 which act as execution resources for a respective control logic. The execution of the threads 104 and 106 is driven by events 108 and 110, respectively, generated by object logic in the process and administered by a local event queue 112 and 114 belonging to the respective threads 104 and 106. The process is started by a message 116 being received by an access agent object 118 from an access process, not shown. The access agent object 118 will as a consequence generate the event 108 which will be distributed to thread 104 to start execution of this thread. The executing control logic of the thread 104 performs a method call 120 towards an object 122, which as a consequence will generate the event 110 which will be distributed to the thread 106 to start execution of this thread.

Figure 2:
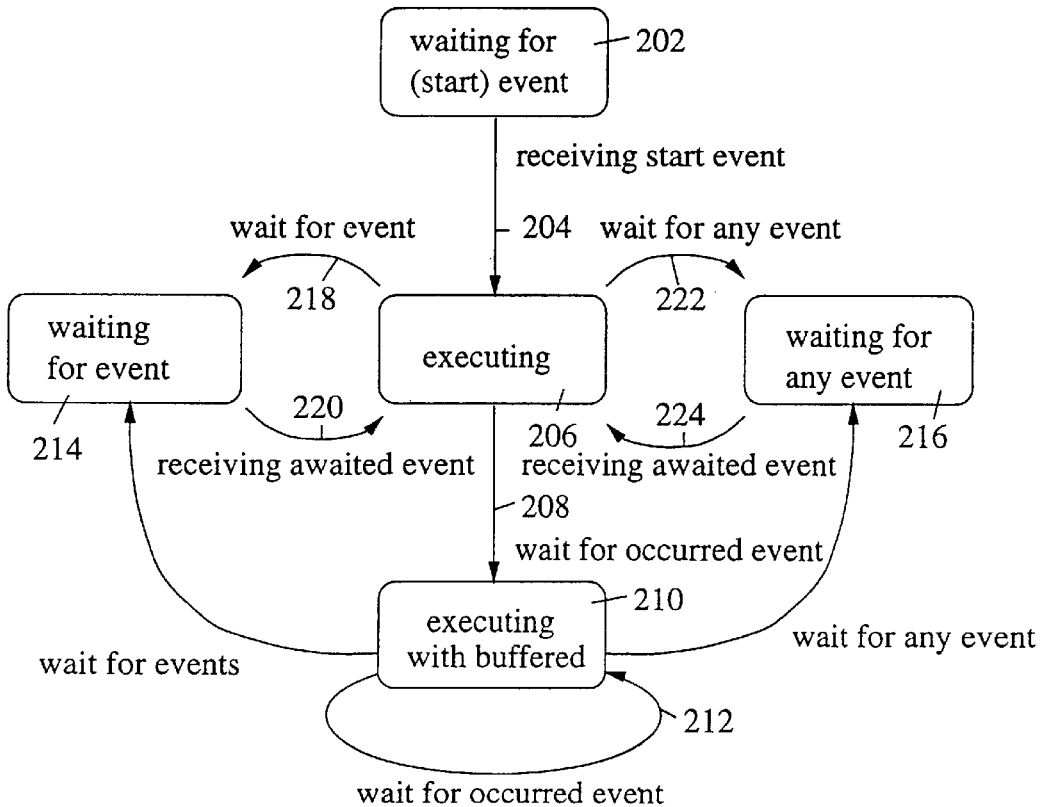
FIG. 2 is a state transition diagram for the execution of threads.

In FIG. 2 a state transition diagram for the execution of threads is shown. Start and end states are not shown, but will appear from the following.

A new thread, when created, will not start executing immediately, but will await, in a "waiting for start event state" 202, a start event that it will post to itself. At reception of the start event indicated by arrow 204, the execution of the thread starts, indicated by state "executing" 206. When executing, the thread may enter a wait state, waiting for some event(s) to occur.

Actually, if the thread will enter wait-state depends on whether the awaited event has already occurred or not. If it has already occurred, the thread will continue executing, although it will enter, indicated by arrow 208, a state "executing-with-buffered" 210, while waiting for the occurred event, indicated by arrow 212. Otherwise, i.e. if the event has not occurred yet, one of two wait states 218 or 220 is entered. The state 214 "waiting for event" is used for waiting for an individual event. Transition arrows for "wait for event" and "receiving awaited event" are indicated at 216 and 218, respectively. The state 216 "waiting for any event" is used for waiting for any event. Transition arrows for "wait for any event" and "receiving awaited event" are indicated at 222 and 224, respectively. The reason for having two wait-states is that when the thread is about to be started again, as a result of an occurred event, the thread uses different strategies when matching the event against the local event queue: if waiting for any event, the event will always "match", otherwise, a search through the local event queue must be done. If there is a match, the thread will start executing again, entering the "executing" state 206.

When in the state 210, "executing-with-buffered", the thread may wait for some event to occur. If the event has already occurred (it is found in the local event queue), the execution continues immediately in the same state, otherwise the thread enters one of the wait states 214 or 216.

There is no end-state in FIG. 2, but end is reached when the main function of the thread returns. For the main function to return, the thread must be executing, so it is possible to make the transition to the end-state from either "executing" state 206 or from "executing-with-buffered" state 212.

Events must not be deleted until every interested thread has received it and has had the opportunity to deal with it. The problem to determine when this situation has occurred is solved by cooperation between the Event and Thread blocks. In general, it is the event that deletes itself after having been distributed to all interested threads, but since a thread not always deals with an event immediately upon reception, measures have to be taken to prevent the event from being deleted directly after distribution. Such situations occur when a thread receives an event which it is not currently waiting for. It is only after having waited for it and processed it that the event can be deleted.

A reference counter is used to keep track of how many references to the event that exist. When the counter has decremented to 0 the event will delete itself. The counter will be incremented when a received event is buffered within a thread, and decremented when the thread has waited for a buffered event and reaches a new waiting state or dies. When the thread dies all buffered events' reference counters must be decremented. Further description of this will follow in connection with a more detailed description of the event block later on.

As regards object interaction, the Thread class manages switching between two execution thread-contexts, viz. the current thread-context and the thread's own thread-context. When the thread receives an event, which it is waiting for, the current thread-context is saved and a switch to the thread's own thread-context is made. When the thread wants to wait for an event, which is not in the local event queue, other threads are given the opportunity to execute.

A switch to the thread's own thread-context is only made when an event, that the thread is waiting for, is received. Therefore a special procedure is performed to start a thread. First, a thread constructor sets up a monitoring of a special start event. Then a corresponding event is created and posted. Later the thread will receive the event, treating it like any normally received event, and recognize it as an event that the thread is waiting for, thereby starting the execution of the thread.

Events are used to coordinate the execution of threads, by informing all interested threads as soon as an internal or external incident occurs in a specific process. Examples of such incidents are disconnection of a call (external) and timeout (internal). In other words, the event function supports a mechanism for communicating within a process.

Events initiate the execution of threads. An event does not have a predestined receiver, but is distributed to the threads that have declared their interest in that specific event. Because of the event function, it is possible to construct object logic and control logic independently. An event consists of a name, sender and associated data carrying information from the generator to the thread, and exists only within processes.

Events are generated by objects in a process, normally as a result of a received message, e.g. a message that a subscriber has put the hook on.

The specification of events may be performed by means of the graphical language and a design language in combination. The control logic is, as mentioned earlier, specified by flowscripts of the graphical language, while the objects constituting object logic can be specified by an OBJECT TYPE OR CLASS specification in a design language.

Event handling has a number of characterizing features as follows:

An event is distributed to all threads which have monitored it. All events generated within a process end up in a common "letter box", being the "event handler" mentioned earlier, from which they are sent further to all threads which have indicated their interest in these events. If no one is interested in these particular events then they are thrown away. These indications of interest, i.e. the ordering of monitoring of events, must be made explicitly in the flow.

When an event is distributed to a thread, which has monitored its interest in this specific event, the thread might not yet be ready to deal with it. This can be the case if execution has not yet reached the Wait-state for this event or if another thread is executing for the moment. The event is then put in a queue, belonging to the thread, cf. the local event queues 112 and 114 in FIG. 1. When the thread is prepared to take care of the event, it fetches the event from the local event-queue.

The execution will then continue until a new event is needed to decide how to proceed. This event could be another external event or an internal event like a timeout, cf. the events 108 and 110 in FIG. 1.

Broadcast/Active reception. From an event generator point of view an event cannot be directed to a specific recipient. All events generated are distributed to all threads which have monitored the event, including the sending thread. The concept implies that entities generating the events are unaware of entities interested in the events. The receiver decides when to wait and what to wait for ("active reception")

The execution is performed in pseudo-parallel. Threads execute in pseudo-parallel, that is, one at a time. Every execution in a thread starts at the reception of an event that the thread is waiting for, thereafter the thread is executing without being disturbed until it settles itself to wait again or finishes its execution. At that stage another thread can execute, triggered by that event or another. That just described can e.g. be true for the threads 104 and 106 in FIG. 1.

Events are distributed to the threads in the order they were posted. However, since one single event may be distributed to more than one thread, the threads have a priority indicating the distribution order in such a case. A thread may also prevent further distribution of a received event, preventing threads of lower priority from receiving the event.

For a thread to be able to receive an event, the thread must explicitly have monitored the event before it is posted. By monitoring, the thread declares its interest in some event (or events) from some object (or objects). The monitoring causes the event (or events) to be distributed to the thread in question, if the monitoring is made before the event is posted. The thread may also remove an already made monitoring, thereby preventing the event (or events) in question to further be distributed to the thread.

Figure 3:
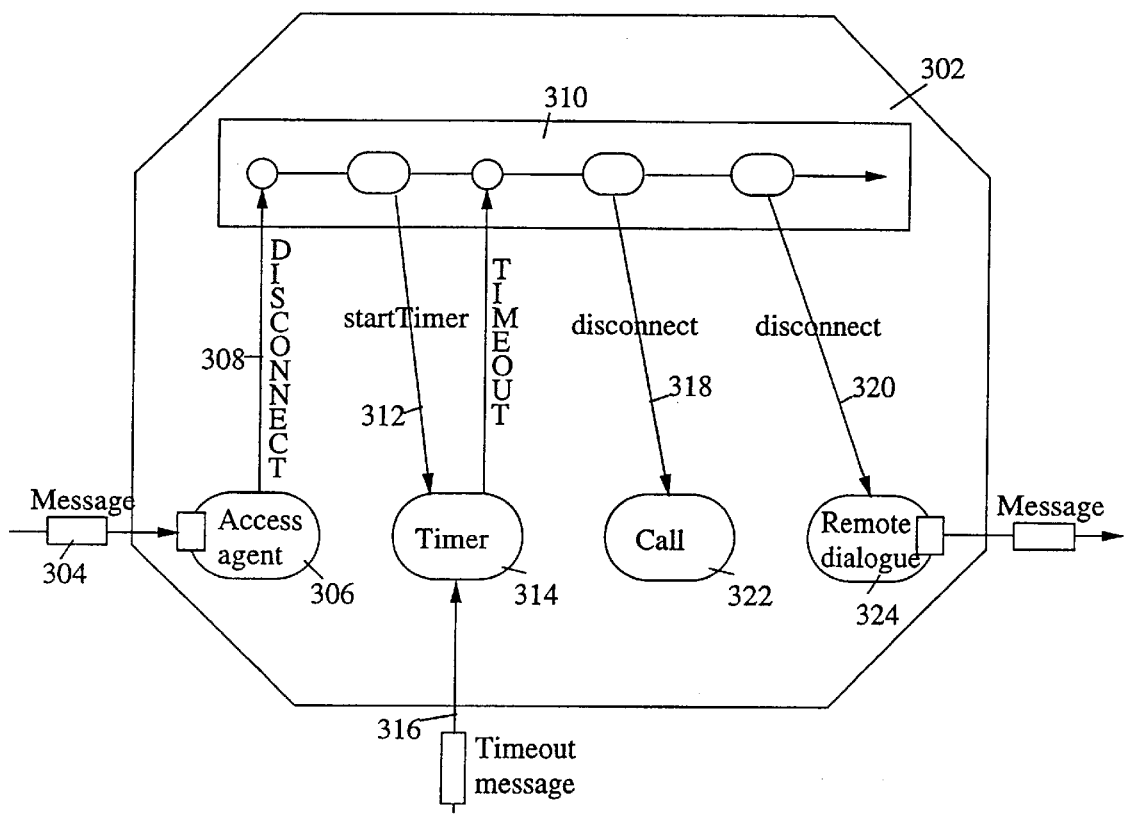
FIG. 3 is a view illustrating a disconnection process in a telecommunication case.

FIG. 3 illustrates a Disconnection executed within a process 302. The disconnection is started by a disconnect message 304 from an access process, not shown. Object logic of an access agent 306 will as a consequence by means of an event 308 trig a thread 310 in which some disconnection control logic is executing. This logic starts, indicated by arrow 312, a timing function by requesting an instance 314 of a timer object to be created.

The execution of the control logic of the thread 310 then comes to a stop waiting for a new event which could be either a timeout or another message from the outside world. In the example a timeout message 316 is received by the instance 314 which sends a TIMEOUT event to the thread 310 that will again start up the execution of the function logic of the thread 310 resulting in disconnect messages 318 and 320 to a Call object 322 and a RemoteDialogue object 324, respectively.

The event handling mechanism offers the following services.

Posting event. Objects which are defined as event generating are able to send generated events. The typical case appears when an event is created as a consequence of an internal or external incident, for instance a hook-on from a subscriber or the release of a time-supervision.

Monitoring events. An event-receiving thread may announce interest in certain events which it wishes to receive. The interest in either one specific event or in all possible events generated by a certain thread is stated in a specific subscription order. When/if the event is generated and sent away, it will arrive at the receiving threads subscribing to that event.

Cancelling monitorings of events. A thread that is no longer interested in an event can cancel its monitoring of it.

Preventing further distribution of an event. A thread may prevent an event from being further distributed after reception. By "killing" the event, the threads which have not yet received the event will never be able to do so.

Each one of these services will be described more thoroughly in the following.

To post an event means that a generated event is sent to a central object, the event handler, which will distribute it to interested threads. As mentioned earlier events are generated as a result of external or internal incidents. The external incidents are typically reported to the process as messages which in turn are transformed to events by event generators within the process. When the events later are distributed it is done in the same order as they were posted.

Figure 4:
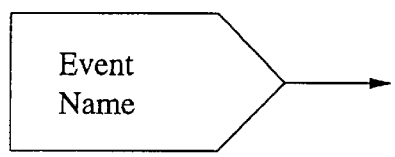
FIGS. 4–7 show symbols used in a graphical programming language used for identifying respective managing situations of events.

Syntax of the graphical programming language for posting events may e.g. include a symbol for posting an event of the kind shown in FIG. 4. All waiting threads which have monitored the event will receive it. As shown the symbol includes the name of the event sent out. Symbol input parameter data may also be posted with the event as will appear from further explanation following later. The symbol has an exit without a result value and points directly to the next node to be executed.

From the point of view of semantics, the executed thread may e.g. generate the event "EventName". This event, with its included data, will be posted to all threads waiting for it. As earlier stated, the event cannot be posted to a specific thread.

All threads which are interested in specific events must specify their interests by ordering monitoring of these events, i.e. announcing an event receiver's interest in a certain event. Monitoring is done by creating a monitor object containing data that identifies an event uniquely. In other words, monitor objects announce interest in events on behalf of event receivers. Syntax in the graphical programming language may e.g. specify start monitoring event by the symbol shown in FIG. 5, being a rhomb having an upright black flag. There is always at least one sender and one event specified within this symbol.

Figure 5:
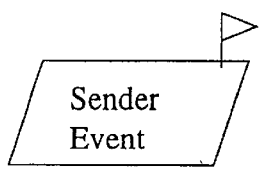

Each of the two symbols shown in FIGS. 4 and 5, respectively, and described above will have only one output arrow pointing to a next node to be executed and no result value will be attached to the arrow.

There are four different possibilities of specifying "Start to monitor an event", depending on the number of events desired to be monitored and the number of different senders from which the events origin. These possibilities are:

Monitoring of one event from a certain sender.

Monitoring of any event from a certain sender.

Monitoring of one event from a class of senders.

Monitoring of any event from a class of senders.

From the point of view of semantics it should be noted that, when the symbol for start of monitoring is executed in a flow, all instances of the specified events will be distributed to this flow whenever they occur. These events are then queued in the thread's local event queue until they are dispatched by the flow.

To monitor an event from a class of senders means that if any instance of the class posts the event, it is delivered to the receiver.

As has appeared earlier, a thread that needs some information from an object or another thread in order to proceed, can put itself in a wait state. The execution of the thread will then be halted and some other thread will start running. The execution is resumed when the desired information is received in the form of an event, but not until the presently active thread has stopped executing.

Figure 6:
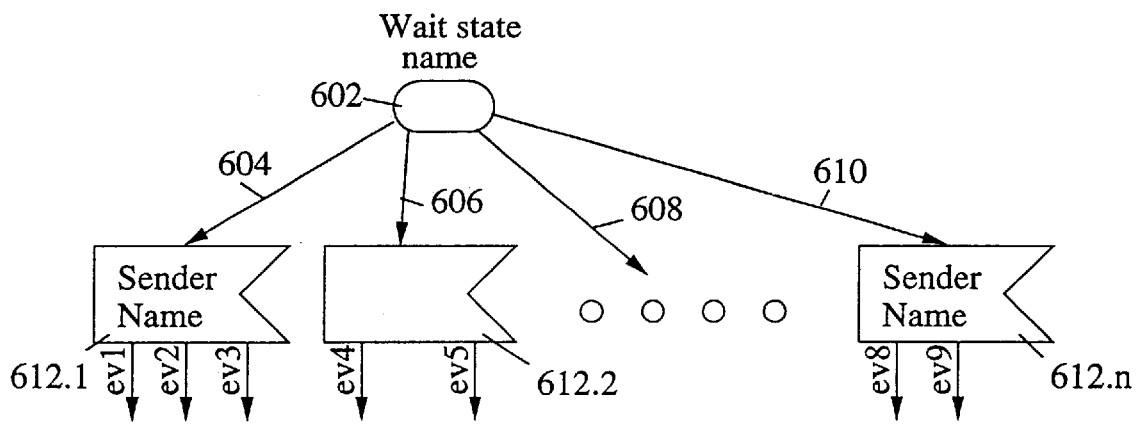

FIG. 6 illustrates a wait state in a flow as expressed by the graphical programming language. The wait state proper is symbolized with an oval 602 from which arrows 604, 606, 608 and 610 point at symbols 612.1, 612.2 . . . 612.n. The symbols indicate different senders and further arrows below each symbol indicate the events that the thread (flow) is waiting for from the respective senders. As can be seen in FIG. 6, these events are indicated as ev1, ev2, ev3; ev4, ev5 and ev8, ev9 for the respective senders 612.1 612.2 and 612.n, respectively. The names of the senders are included in the symbols. A symbol including an asterisk could also be used, as will be explained further below. A wait state can have a name. It can also have a list of conditions associated with it.

When execution of the flow reaches the wait state, the condition list, if any, is first tested. If the conditions are not met then there is an error. If the conditions are met or if there isn't any condition list, then execution stops since a wait state has been reached. Execution is resumed when one of the given events is received from the sender to which the event is tied. The execution then follows the arrow which is named by the event which occurred.

As name of the sender the following could be applied:

A variable pointing to an object instance. The event has to come from the given object instance for execution to be resumed.

Thread identity. The events must come from the given thread instance for execution to be resumed.

Asterisk (*). This means that any of the stated events are of interest, no matter which object or thread that generates it.

A previously done monitoring may be removed if the event receiver is no longer interested in the event. Removing a monitoring is accomplished by deleting the monitor object that was created when the event receiver earlier announced its interest in the event.

Figure 7:
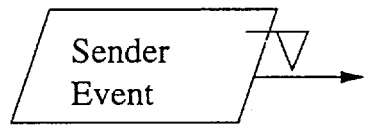

In the programming language, stop monitoring event can e.g. be specified by the symbol illustrated in FIG. 7. As shown, this symbol differs from the one of FIG. 5, in that it has a lowered flag. There is always at least one sender and one event specified with the symbol. The symbol has only one outgoing arrow pointing to the next node to be executed and no result value is attached to the arrow. When the symbol stop monitoring is executed in a flow, instances of the specified events will no longer be received by the flow.

There is one single event predefined, viz. the event DEATH, which is automatically generated when an event-generating object is deleted. The event DEATH can be monitored and received just as any other event, but it does not carry any data. The keyword DEATH should be used whenever reference is made to this event.

Figure 8:
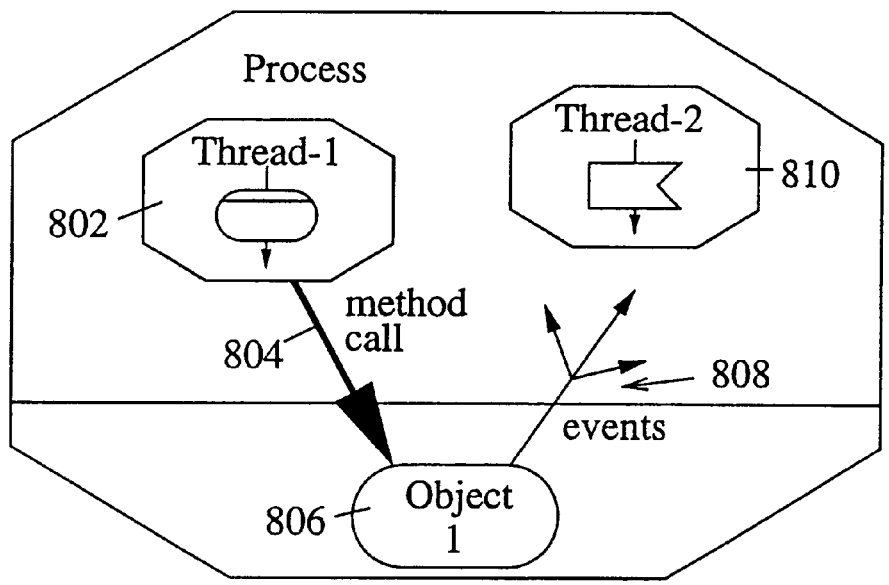
FIG. 8 illustrates indirect communication between threads via object method calls and events.

There exist some possibilities for communication between threads. One is communication via object method calls. Objects can generate events when they execute certain methods. The events are then sent to all interested threads. This is illustrated with an example in FIG. 8. A thread 802 sends, arrow 804, a method call to an object 806. The object 806 in turn sends events 808 to another thread 810. In this way communication between two threads is possible. By combining these mechanisms in an appropriate way, it is possible to get two threads to "talk to each other".

Figure 9:
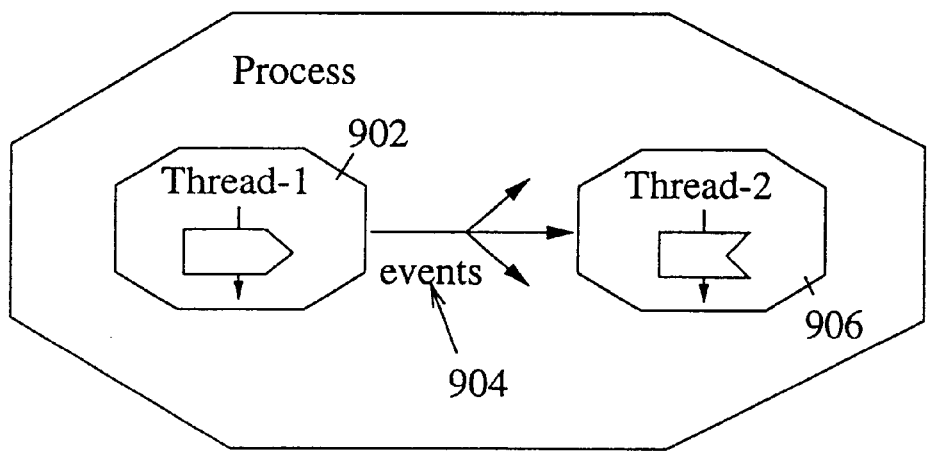
FIG. 9 illustrates direct communication between threads via events, FIG. 10 in a view using symbols of the graphical language illustrates buffering events in a local event queue during the prosecution of a process.

The flow itself, i.e. threads, can also generate events. This implies that two (or more) threads can talk directly to each other by sending events to each other and by receiving events from each other. This is illustrated in FIG. 9 with an example, in which a thread 902 sends events 904 to another thread 906. Note that even though the simplified Figure seems to suggest that the events are delivered directly between the threads, this is not the case. The events are distributed via an event handler, not shown.

Figure 10:
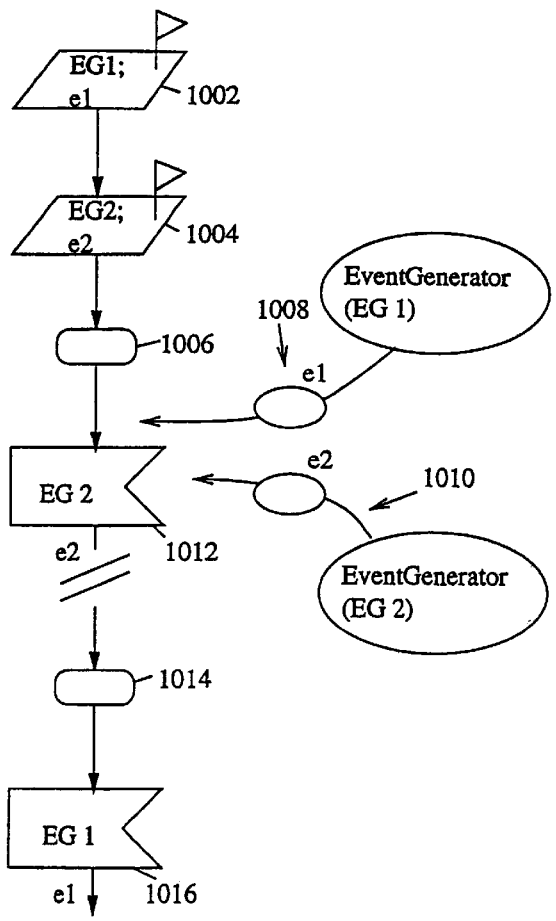

Reference will now be made to FIG. 10 which illustrates a flow chart of occurrences in a process, and to FIG. 11 which illustrates the process and some of its elements, the process being indicated by 1102. Monitored events can be buffered in a local event queue by a thread. Buffering means that after an event has been monitored all occurrences of it can be observed, whereas events occurring before the monitoring was issued are not available. If an event is no longer desirable the monitoring should be removed. Already received events remain in a local event queue until they are "waited for", in which case the thread is allowed to continue its execution. If the event has not yet occurred when the thread "waits for" it, execution of the thread will be idle until the event occurs.

Figure 11:
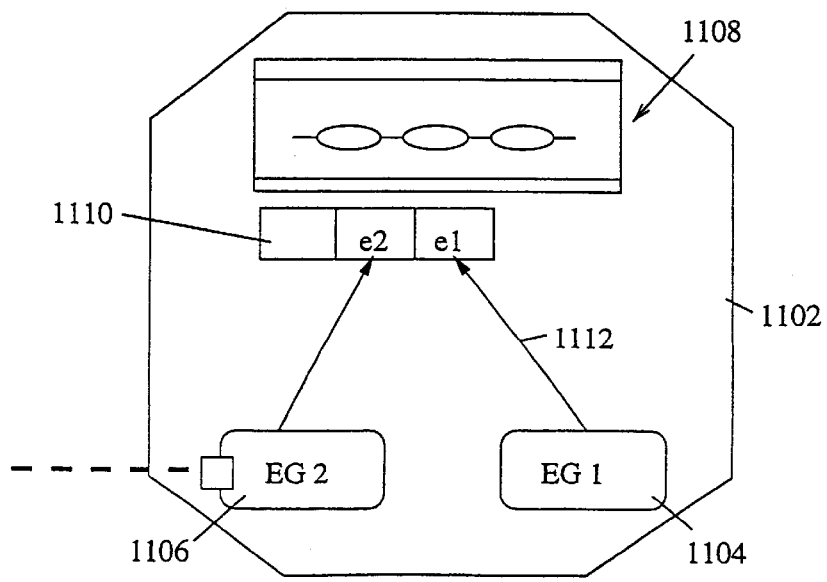
FIG. 11 is a conventional view illustrating the same situation as FIG. 10 but showing the process with its included elements and messages.

In FIG. 10 1002 indicates starting, as a first step of the process 1102 of FIG. 11, monitoring of an event e1, the source of which is an event generator EG1. Starting monitoring of an event e2, the source of which is an event generator EG2, is indicated at 1004. FIG. 11 indicates the event generators EG1 and EG2 as being included in the process 1102 at 1104 and 1106, respectively. The process 1102 also includes a thread 1108 having a local event queue 1110.

In FIG. 10 1006 indicates a wait state in which the occurrence of event e2 is awaited while halting the execution. At 1008 it is indicated that event e1 from event generator EG1 now occurs, it being indicated by arrow 1112 in FIG. 11 that the event e1 is buffered in the local event queue 1110. At 1010 in FIG. 10 it is indicated that event e2 from event generator EG2 now occurs, and at 1012 starting execution thereof is indicated.

Symbol 1014 in FIG. 10 indicates halting of the execution in awaitance of event e1. This event has already occurred and starting execution thereof is indicated at 1016.

A method for scheduling event-driven program threads will now be described more in detail with reference to FIG. 12. In this description object classes will be mentioned, which are included in a particular class structure. These classes will successively be described in some more detail as their names turn up in the following.

Figure 12:
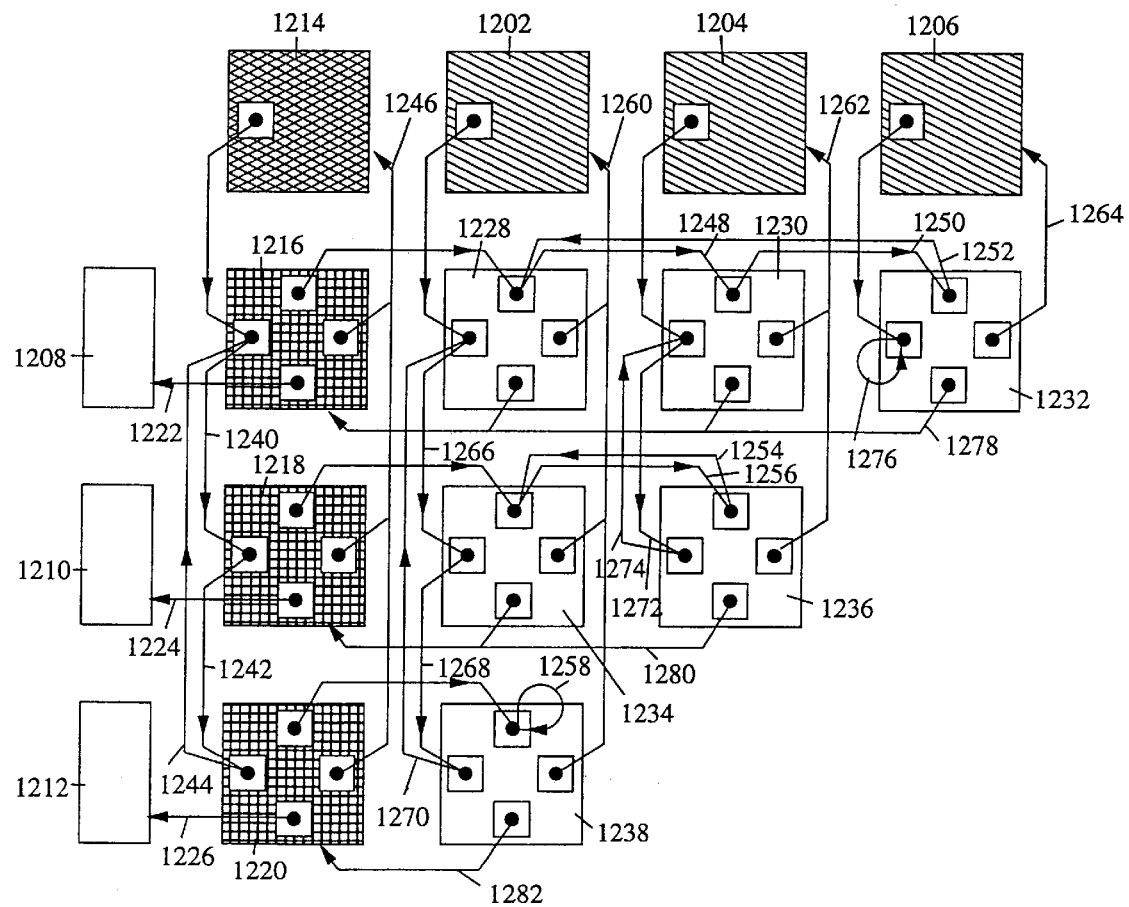
FIG. 12 is a view showing the central data structure of an event mechanism on which the invention is based.

In FIG. 12 blocks 1202–1206 indicate a respective object event generator of a base class EventGenerator, the objects of which can post events to an event handler object, of a central service class EventHandler of the event handling mechanism, for further distribution. Blocks 1208–1212 indicate a respective object event receiver (thread) of an abstract base class EventReceiver that by inheritance enables reception of event objects.

Figure 13:
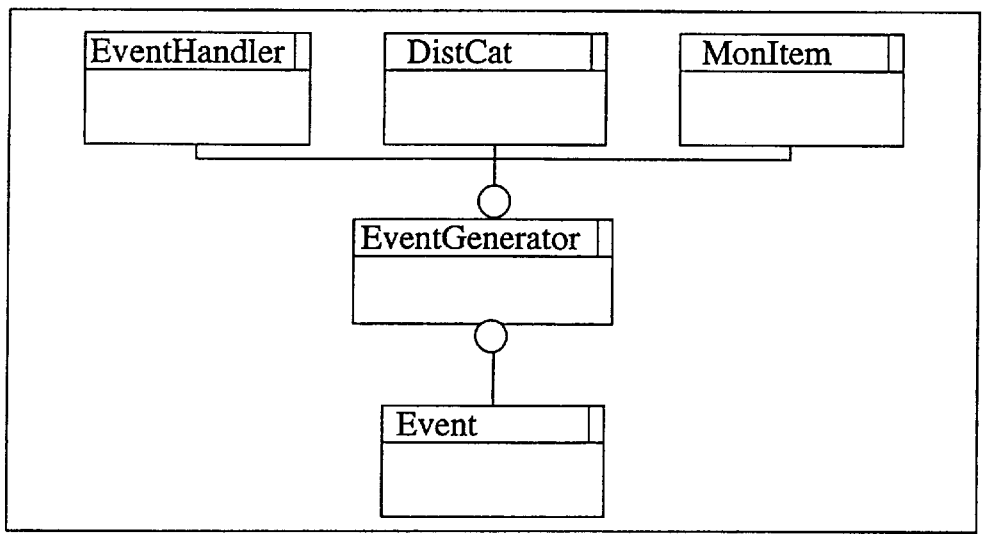
FIGS. 13–18 show the data structure of object classes used in the view of FIG. 12, and FIGS. 19 and 20 show two bit arrays.

A class denominated Event represents a process event. An Event object is uniquely defined by a tag and a source—the event generator. Each event generator is member of some distribution category of a class DistCat, thereby making the monitoring of a group of event generators possible. With reference to FIG. 13, EventGenerator uses the following objects for implementation:

EventHandler for forwarding posting of events, and for announcing creation and destruction of the generator.

DistCat for membership in some distribution category.

MonItem for keeping track of all monitoring for events from the generator.

For interface the EventGenerator uses Event for posting events.

The EventHandler is the central class, where the structure to keep track of all monitorings, event generators and event receivers is maintained.

Figure 14:
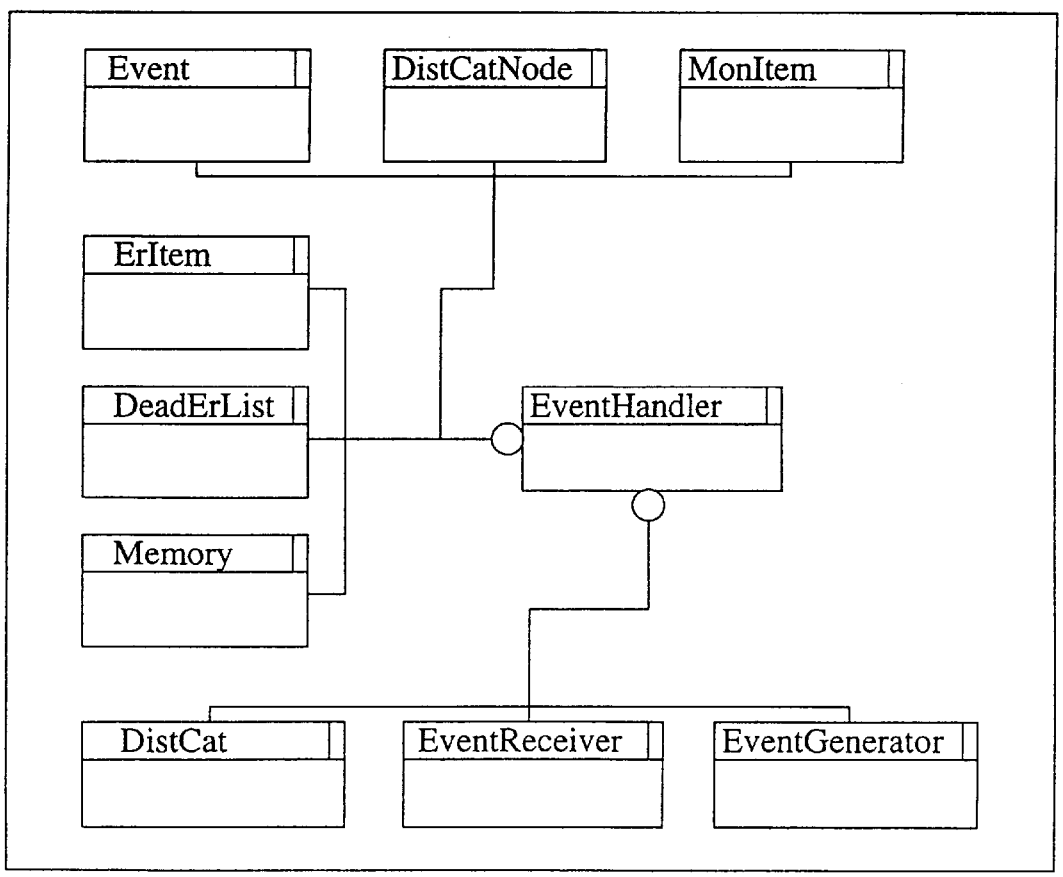

With reference to FIG. 14 EventHandler uses the following object classes for implementation:

MonItem to keep track of all monitorings for individual event generators.

DistCatNode to keep track of which event generator belongs to which distribution category. The nodes are kept in a binary tree.

Event for saving events until distribution time and then delivering them to receivers.

ErItem to keep track of all monitorings for distribution categories.

DeadErList to keep track of which event receivers have been destroyed.

Memory for allocation of internal objects.

For interface the EventHandler uses the following object classes:

DistCat for registrating monitorings for distribution categories.

EventReceiver for registrating monitorings.

EventGenerator for registrating monitorings for individual event generators.

The EventReceiver is an abstract base class, which, by inheritance, adds the possibility to receive event to its derived classes. The thread is derived from EventReceiver.

Figure 15:
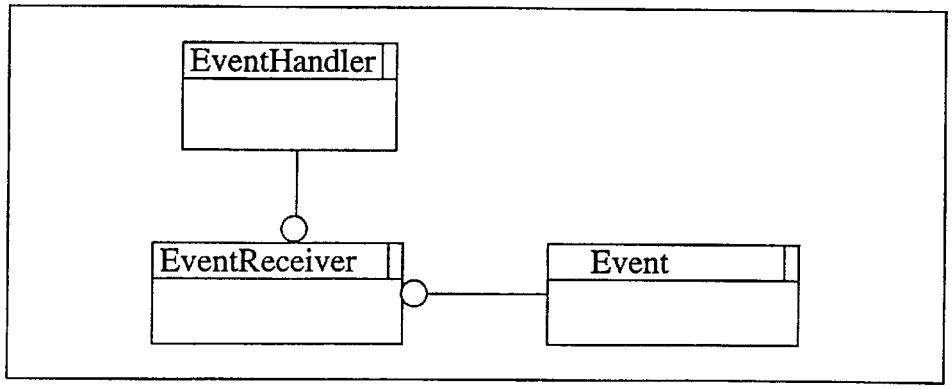

Referring to FIG. 15 EventReceiver uses for implementation the class EventHandler for delivering indications of construction and destruction of the receiver.

For interface EventReceiver uses the class Event, which is delivered to the class derived from the receiver.

Returning to FIG. 12, a block 1214 indicates an object DistCatNode (Distribution Category Node) which is a node in a binary tree DistCatTree. DistCatTree contains a list of objects of the class ErItem (Event Receiver Item). This class is used for keeping track of monitorings of distribution categories. Each object ErItem keeps a pointer to an event receiver and forwards distributed events to it. Blocks 1216–1220 indicate a respective ErItem object having a respective pointer 1222–1226 pointing to a respective one of the event receivers 1208–1212.

Figure 16:
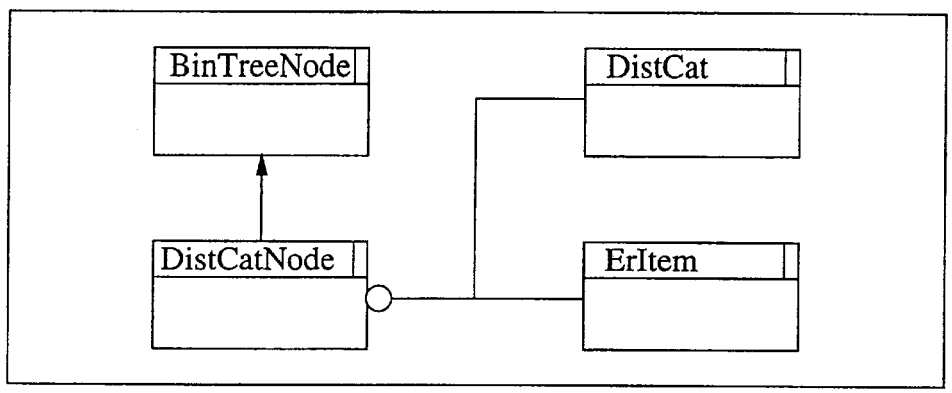

DistCatNode keeps track of all event receivers of one distribution category. With reference to FIG. 16, DistCatNode inherits BinTreeNode, thereby having the property of being a member of binary tree for fast lookup by the event handler. For implementation DistCatNode uses DistCat, for remembering the distribution category, and ErItem for keeping a ring of all event receivers of the same distribution category (every event receiver for which a monitoring is done is represented by an ErItem in the internal structure). The word "ring" above and further appearing below is used to characterize a list of linked entities, such as the event receivers just mentioned, in which the last entity of the list points back to the first entity of the list. The reason for referring to a ring is just the fact that the embodiment shown in FIG. 12 as an example builds upon this type of lists. The lists in question do not, however, need to be in the form of linked rings.

Figure 17:
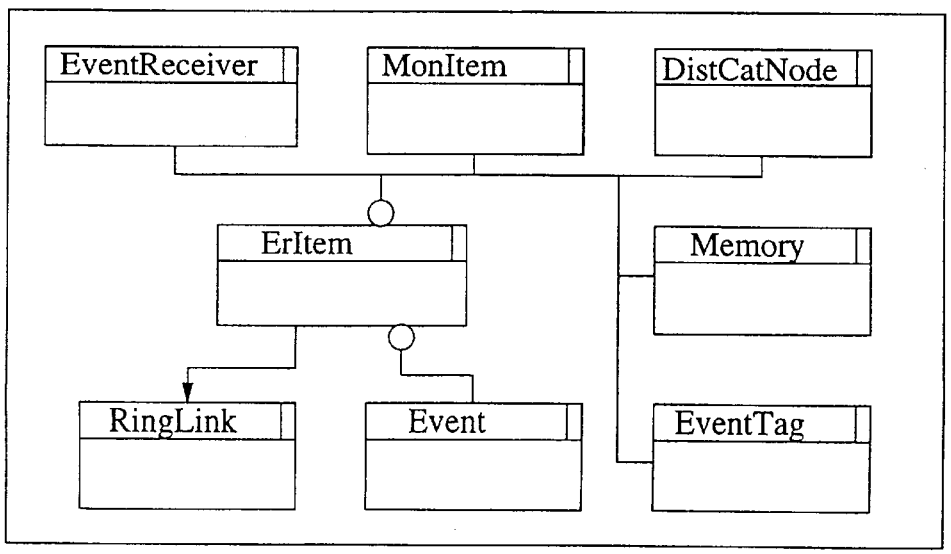

With reference to FIG. 17 the class ErItem is the representation of a monitored event receiver in the internal structure. It keeps track of monitorings for distribution categories, the events of which shall be received by the event receiver. It also keeps a ring of all monitorings for individual event generators (represented by MonItems), the events of which shall be received by the event receiver.

ErItem inherits RingLink so that all ErItems of the same distribution category can be linked together.

For implementation ErItem uses the following classes:

EventReceiver, for forwarding receiveEvent and handle-Deadlock function calls.

MonItem, for keeping a ring of all monitorings for individual event generators for the receiver in question.

DistCatNode, so that the ErItem can be unlinked from the DistCatNodes ring of ErItems when the ErItem is destroyed.

Memory, so that the ErItem returns occupied memory correctly.

EventTag, when matching occurred tags against monitorings, and when updating and "downdating" monitorings.

For interface ErItem uses Event, which is forwarded to the corresponding event receiver when distributing the event.

Returning to FIG. 12 each ErItem object also keeps a list of objects of the class MonItem (Monitoring Item). This class is used for keeping track of monitorings of individual event generators. Blocks 1228–1238 indicate a respective MonItem object.

Figures 18, 19, 20:
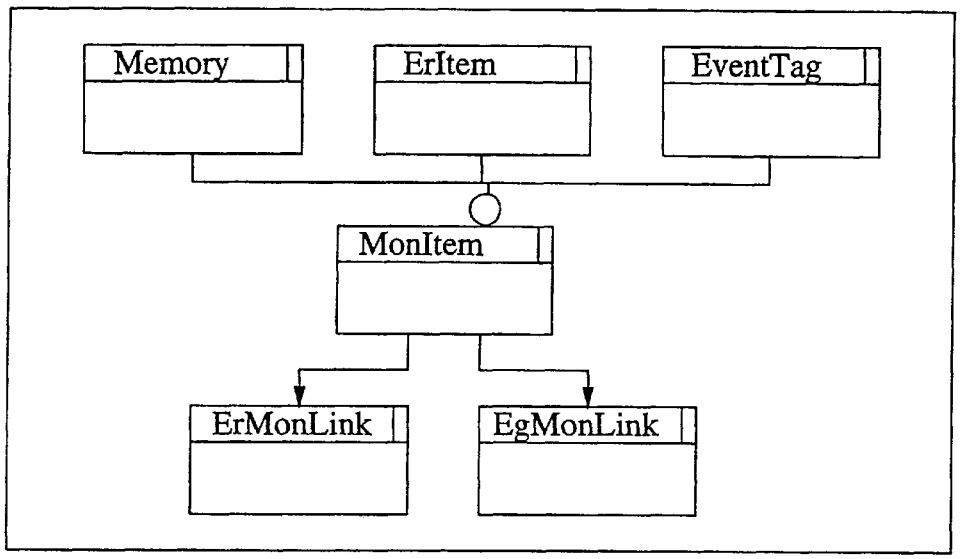

With reference to FIG. 18 MonItem is the internal representation of a monitoring of an individual event generator.

MonItem inherits:

ErMonLink, to be able to be a member of the ring the ErItem keeps all individual monitorings for its event receiver.

EgMonLink, to be able to be a member of the event generators ring of MonItems, that is, the ring all individual monitorings made for the event generator.

For implementation MonItem uses the classes:

ErItem, for keeping a pointer to the ErItem which keeps the pointer to the event receiver.

EventTag, when matching occurred event tags against monitorings, and when updating and "downdating" monitorings.

Memory, so that the ErItem returns occupied memory correctly.

Returning to FIG. 12, it is possible to reach all ErItems via the DistCatTree. Each DistCatNode object contained in the tree, such as object 1214, contains a ring of all ErItems, such as objects 1216–1220, created to represent a monitoring of either individual event generators, such as objects 1202–1206, or distribution categories. In FIG. 12, the ring is indicated by arrows 1240, 1242 and 1244 connecting together the ErItem objects 1216–1220. All ErItems in the ring of one DistCatNode are results of monitoring for event generators of the same distribution category.

Generally, ErItems are linked into rings, where each ring belongs to some DistCatNode. The ring is ordered according to the receivers priority. An ErItem is created when a monitoring for an event receiver that has not previously been monitored is created. The ErItem is then linked into the ring of ErItems belonging to the DistCatNode corresponding to the distribution category of the event generator of the monitoring.

The ErItem in itself, has a pointer, cf. pointers 1222–1226, to its corresponding event receiver, cf. event receivers 1208–1212 for forwarding receiveEvent and handleDeadlock function calls. Furthermore, each ErItem has a pointer to the DistCatNode, cf. node 1214, for fast unlinking from the DistCatNode's ring of ErItems. In FIG. 12 such pointers are indicated by a common arrow 1246 originating from each of the ErItems 1216–1220. Each ErItem also has a member which is a ring of MonItems. For ErItem 1216 such ring contains the MonItems 1228–1232 and is represented by arrows 1248–1252. For ErItem 1218 the ring contains the MonItems 1234 and 1236 and is represented by arrows 1254 and 1256. The "ring" of ErItem 1220 contains the single MonItem 1238 and is indicated by the arrow 1258.

Each of the MonItems 1228–1238 represents a monitoring of an individual event generator. Thus, the MonItems 1228, 1234 and 1238 represent monitoring of the event generator 1202, indicated by an arrow 1260 originating from each of the MonItems 1228, 1234, 1238. In the same way, the MonItems 1230 and 1236 represent monitoring of the event generator 1204, indicated by an arrow 1262 originating from each of the MonItems 1230 and 1236, and the MonItem 1232 represents monitoring of the event generator 1206, indicated by an arrow 1264. In each case the monitorings event receiver is the one pointed at by the ErItem. Thus, for the MonItems 1228, 1230 and 1232 the ErItem 1216 points to the event receiver 1208, for the MonItems 1234 and 1236 the ErItem 1218 points to the event receiver 1210, and for the MonItem 1238 the ErItem 1220 points to the event receiver 1212. The ErItems keep their respective ring of MonItems (which is unordered) to make sure all monitorings are properly removed when the event receiver dies.

The ErItem also keeps track of all monitorings of distribution categories. How this is done is explained later.

ErItems are objects allocated from fast memory (handled by the class Memory), therefore they also keep a pointer to the memory from which they are allocated, and to which they shall return memory when they are destroyed.

Each event generator, such as event generators 1202–1206, keeps a ring of MonItems, where each link in the ring corresponds to a monitoring with the event generator as source of the event. Thus, for the event generator 1202 the MonItems 1228, 1234 and 1238 are included in a ring indicated by arrows 1266, 1268 and 1270. For the event generator 1204 the MonItems 1230 and 1236 are included in a ring indicated by arrows 1272 and 1274. For the event generator 1206 the MonItem 1232 is included in a "ring" indicated by an arrow 1276.

Each event generator also keeps a pointer to the event handler, for forwarding the posting of events. Furthermore, it has a member of type DistCat indicating the distribution category to which the event generator belongs.

As has been mentioned above, a MonItem represents one or more monitorings for one event generator to some event receiver. As should also have appeared from the above, a MonItem is member of two rings, one ring (ordered according to the receivers priority) belonging to the event generator, and one ring (unordered) belonging to the ErItem corresponding to the monitorings event receiver. Thus, as an example, the MonItem 1228 is a member of the ring 1266, 1268, 1270 belonging to the event generator 1202, as well as a member of the ring 1248, 1250, 1252 belonging to the ErItem 1216 corresponding to the event receiver 1208.

Each MonItem keeps a pointer to its ErItem for fast unlinking from the ErItems ring of MonItems and for finding the event receiver when building distribution lists. Thus, the MonItems 1228, 1230 and 1232 keep pointers to the ErItem 1216, indicated by a common arrow 1278. The MonItems 1234 and 1236 keep pointers to the ErItem 1218, indicated by a common arrow 1280, and the MonItem 1238 keeps a pointer to the ErItem 1220, indicated by an arrow 1282. Each MonItem also contains a pointer, indicated by the arrows 1260, 1262 and 1264, respectively, to the event generator 1202, 1204 and 1206, respectively, for fast unlinking from the generator's ring of MonItems. For fast building of the distribution list, they also contain the priority of the event receiver monitored.

MonItems are objects allocated from fast memory (handled by the class Memory), therefore they also keep a pointer to the memory from which they are allocated, and to which they shall return memory when they are destroyed.

A MonItem represents one or more monitorings made for events from one generator to one receiver. To keep track of how many monitorings the MonItem object represents, it contains a reference counter.

The event handler is the central object in the event handling mechanism, which maintains the structures keeping track of all monitorings. The DistCatTree is a member of the event handler and is used by the event handler to find the ErItem corresponding to an event generator or a distribution category when a monitoring is created. If no ErItem is found, the event handler creates one and inserts it into the DistCatTree.

The event handler keeps a ring of all events posted but not distributed, that is, the events are waiting to be distributed to the event receivers. When an event receiver dies, it cannot receive events. Therefore, the MonItems created for this receiver are of no more use. They cannot be deleted, however, because there may still exist Monitor objects pointing at the MonItem. The MonItems are moved to a list of "dead" MonItems which is scanned at the end of each job, when the MonItems with a reference count of zero are unlinked and deleted.

The situation is almost the same for the ErItems when the receiver dies. The ErItem cannot be immediately destroyed, because the user may have Monitor objects referencing the ErItem. There may also exist distribution lists which reference the ErItem. To take care of the problem with the distribution lists, the ErItems pointer to the receiver is set to 0, when the receiver dies, and the ErItem will then no longer forward any events to the receiver. At the end of each job, all ErItems with the receiver pointer equal to zero, are moved to a list of "dead" ErItems. This list is scanned at the end of each job, when the ErItems with a reference count of zero are unlinked and deleted.

Event objects are software representations of occurred events, which are delivered to event receivers. An event keeps a pointer to the event generator from which the event was posted, and a distribution list containing DistItems. The distribution list is built when the event is posted, and each DistItem contains a pointer to an ErItem. The distribution list is ordered according to the priority of the ErItems event receiver. Each event also contains an event tag.

A distribution list is built for each event when it is posted. The distribution list is built by the event handler which scans the internal structure looking for MonItems and ErItems matching the events event tag. The distribution list is a singly linked list of DistItems, each containing a pointer to an ErItem, which in turn will forward the event to its event receiver at distribution.

To build the distribution list, the ring of ErItems corresponding to the distribution category of the event generator posting the event should be found. The ring is held by a node in the DistCatTree. If no ring is found, there are no monitorings for the event which then can be thrown away (deleted).

Furthermore there is needed the ring of MonItems representing monitoring made for the event generator. This ring is held by the event generator.

These two rings, below called er-ring and mon-ring, respectively, are then scanned, and the members are matched against the tag of the posted event, while keeping in mind that both rings are ordered according to the priority of the event receiver.

The scanning starts by scanning the mon-ring for a matching MonItem. When found, the er-ring is stepped through until a current ErItem is pointed at by the MonItem. All matching ErItems are collected to the distribution list while performing this. The ErItem pointed at by the MonItem is then put on the distribution list and the er-ring pointer is stepped one step to avoid that the event is distributed twice to the receiver. The described process is repeated until both rings are completely scanned. The distribution list is now complete and is given to the event.

Each posted event is put on a ring waiting for distribution. The distribution itself is quite simple because each event carries its own distribution list, so the distribution is reduced to following steps. For each event on the event-ring, the event is removed and distributed to all receivers on its distribution list. In between each event-delivery, the eventKilled flag has to be checked to see if the last receiver has stopped the distribution with a killEvent in which case the distribution will continue with the next event.

As mentioned above, ErItems keep track of monitorings for distribution categories, and MonItems keep track of monitorings for individual event generators. This is done by keeping an array of bits, where each bit corresponds to one event tag. The bits are set when monitorings are created and cleared when they are destroyed. The event tag is composed if two components, called part and index, where part indicates the part of the bitarray, cf. 0,1,2,3 in FIG. 19 and index indicates which bit in the corresponding part that is set.

For example, the event tags (0,9), (0,257) and (2,65) matches the bitarray in FIG. 19.

Notice that the least significant bit of the index component of the event tag is always set. That is because a monitoring of all events must always match. For example, if to the bitarray from FIG. 19 a monitoring for all events is added, the last bit in all parts will be set, cf. FIG. 20.

Therefore, care should be taken when composing event tags for the events, to select them from the sequence $(0,5)$, $(0,9)$, ... $(0,2^{31}+1)$, $(0,2^{31}+1)$, $(1,3)$, $(1,5)$, ... $(1,2^{31}+1)$, $(2,3)$, $(2,5)$, ... $(2,2^{3/}+1)$, $(3,3)$, $(3,5)$, ... $(3,2^{31}+1)$. Event tags may, however, also be constructed using a constructor that takes one integer as argument and performs a mapping $0{\rightarrow}(0,5)$, $1{\rightarrow}(0,9)$, $2{\rightarrow}(0,17)$, etc. Notice also that the bit immediately to the right of 1sb in part 0 is reserved for the predefined "death" event tag, that is, tag $(0,3)$.

In order to avoid deletion of events before every interested receiver has dealt with the event, a mechanism for handling this is introduced. This is a cooperation between the event-mechanism and Thread. The mechanism is based on the events having a counter which is incremented and decremented by the event handler and Thread. When the counter is decremented to 0 it deletes itself. In the event block incrementation is done when fetching an event, which is the next one to be distributed, from the event handler's ring of posted events. Decrementation is done immediately after the event has been distributed to all interested receivers. If no thread has incremented the event counter, the event will then delete itself.

When an event receiver is destroyed, it is not possible to destroy the corresponding ErItem because there may exist DistItems pointing at them. There may also exist Monitor objects pointing at the ErItems. When an event generator is destroyed, it is not possible to wipe out its list of MonItems, because there may exist Monitor objects pointing at them.

To handle these two cases, there are two lists, DeadErList and DeadMonItemList, of objects declared dead, by which is meant that the object is of no more use, but may not be deleted because it may be referenced by some other object. The DeadErList contains pointers to the ErItems which have lost their event receiver, and the DeadMonItemList is a ring containing all MonItems which have lost their event generator and are still referenced by some Monitor object(s).

A cleanup is performed at the end of each job, and comprises the following steps.

First, in the ring of MonItems for each ErItem on the DeadErList, delete each MonItem, the reference count of which is zero, otherwise put it on the DeadMonItemList.

Then, the DeadMonItemList is stepped through while unlinking and deleting all MonItems which have a reference count equal to zero.

Finally, the DeadErList is stepped through while unlinking and deleting all ErItems with a reference count equal to zero.

What is claimed is:

1. A system for managing internal execution threads in a process, the execution threads being driven by process internal event messages that are generated by event generating functions in response to occurred internal or external incidents and that are distributed to event receiving threads having priority, the distribution being controlled by an event handling function based upon distribution categories of the event generating functions and being performed only to event receiving threads that have interest in such internal event messages and cause monitoring of the occurrency thereof, the system comprising, for each distribution category:

a number of event receiving threads, a number of first entities representing at least one monitoring for one event generating function to some event receiving thread, a number of second entities representing a monitoring for event generating functions of the distribution category, each second entity having a list of all first entities that have monitored an event receiving thread, a third entity for keeping track of all event receiving threads that have monitored the distribution category by means of a list of the second entities, and a number of event generating functions of which each keeps a list of the first entities.

2. The system of claim 1, wherein each first entity keeps a pointer to the event generating function and information regarding the priority of the event receiving thread.

3. The system of claim 1, wherein each second entity is pointed to by one or more of the first entities and keeps a pointer to an event receiving thread for forwarding distributed event messages to it.

4. The system of claim 3, wherein the third entity's list of the second entities points to the event receiving threads.

5. The system of claim 4, wherein each event generating function keeps a pointer to the event handling function for forwarding of events.

6. The system of claim 5, wherein the event receiving threads are associated with a respective priority indication, and during execution of a process, the third entity's list of the second entities is ordered according to a current event receiving thread's priority.

7. The system of claim 5, wherein a second entity is created when creating monitoring for an event receiving thread for which monitoring has not previously been performed, the second entity being then introduced into the list of second entities belonging to the third entity.

8. The system of claim 5, wherein each second entity has a pointer to the third entity for enabling fast removal from the third entity's list of second entities.

9. The system of claim 5, wherein the first entity's pointer to a second entity is kept for enabling fast removal from the second entity's list of first entities and for finding the event receiving thread for building distributions lists, and the first entity's pointer to an event generating function is for enabling fast removal from the event generating function's list of first entities.

10. The system of claim 5, wherein the first entities are objects allocated from fast memory, and keep a pointer to the memory from which they are allocated, and to which they shall return memory when they are removed.

11. The system of claim 5, wherein the third entity is used by the event handling function to find the second entity corresponding to an event generating function or a distribution category when a monitoring is created.

12. The system of claim 5, wherein the event handling function keeps a list of all events posted but not yet distributed to the event receiving threads.

13. The system of claim 5, wherein each first entity contains a reference counter for registrating the monitorings it represents.

14. The system of claim 13, wherein a first entity is moved to a list of non-usable first entities which is scanned at the end of a job in the process, when first entities with a reference count of zero are removed and deleted.

15. The system of claim 5, wherein the second entity's pointer to an event receiving thread is set to zero when the event receiving thread becomes non-usable and the second entity will no longer forward any events to it.

16. The system of claim 15, wherein each second entity contains a reference counter for registrating the monitorings it represents.

17. The system of claim 16, wherein at the end of a job in the process, all second entities with its pointer to an event receiving thread set to zero are moved to a list of non-usable second entities that is scanned at the end of each job when a second entity with a reference count of zero is removed from the list and deleted.

18. The system of claim 5, wherein the second entities are objects allocated from fast memory and keep a pointer to the memory from which they are allocated, and to which they shall return memory when they are destroyed.

19. The system of claim 5, wherein software representations of occurred events that are delivered to event receiving threads each keep a pointer to the event generating function from which the event was posted and a distribution list containing distribution items representing a distribution of one event to one event receiving thread.

20. The system of claim 19, wherein the distribution list is built when the event is posted, each distribution item contains a pointer to a second entity, and the distribution list is ordered according to the priority of the second entity's event receiving thread.

21. The system of claim 19, wherein each event representation contains an event tag representing one type of event regardless of which event generating function may post it.

22. The system of claim 21, wherein the distribution list is built by the event handling function by scanning the internal structure of the process for finding first entities and second entities matching the event tag of events.

23. The system of claim 21, wherein the second entities' keeping track of monitorings for distribution categories and the first entities' keeping track of monitorings for individual event generating functions are performed using an array of bits, each bit corresponds to one event tag, the bits are set when monitorings are created and cleared when they are finished, and each event tag comprises two components, one indicating a part of the bit array and one being an index indicating which bit in the corresponding part that is set.

24. A method, in a system according to claim 5, for avoiding deletion of events before every interested event receiving thread had dealt with the events, comprising the steps of incrementing and decrementing a counter associated with each event by means of the event handling function and a thread, the counter deleting itself when it has been decremented to zero, and the counter incrementing when fetching an event that is the next one to be distributed from the event handling function's list of posted events, and the counter decrementing immediately after the event has been distributed to all interested event receiving threads.

25. A method, in a system according to claim 19, for deleting first and second entities after each job, comprising the steps of
    identifying, for each second entity on a list of non-usable second entities, its list of first entities and deleting each first entity having a reference count being zero, otherwise putting it on a list of non-usable first entities,
    identifying on the list of non-usable first entities all entities having a reference count equal to zero and removing and deleting them, and
    identifying on the list of non-usable second entities all entities having a reference count equal to zero and removing and deleting them.

26. A method, in a system according to claim 20, for building a distribution list, comprising the steps of:
    identifying a list of second entities corresponding to a distribution category of the event generating function posting the event,
    identifying a list of first entities representing monitoring made for the event generating function, and
    scanning the two lists thus identified while matching their members against the tag of the posted event.

27. The method of claim 26, wherein the scanning step comprises the steps of
    scanning the list of first entities for a matching first entity, and when found,
    scanning the list of second entities for finding current second entities pointed at by the found first entity, while collecting all matching second entities to the distribution list, and for each matching entity,
    stepping the pointer of the list of second entities one step to avoid that the event is distributed twice to the event receiving thread,
    repeating until both lists are completely scanned, and
    giving the distribution list thus completed to the event.

28. The method of claim 27, wherein distribution includes the steps of:
    putting each posted event on a list waiting for distribution,
    removing each event on the list and distributing it to all event receiving threads on the event's distribution list, and
    checking between each event delivery whether the last event receiving thread has stopped the distribution.

* * * * *